(12) United States Patent
Kikuya et al.

(10) Patent No.: US 8,066,913 B2
(45) Date of Patent: Nov. 29, 2011

(54) LI-NI COMPOSITE OXIDE PARTICLES FOR NON-AQUEOUS ELECTROLYTE SECONDARY CELL, PROCESS FOR PRODUCING THE SAME, AND NON-AQUEOUS ELECTROLYTE SECONDARY CELL

(75) Inventors: Kazuhiko Kikuya, Fukuoka-ken (JP);
Osamu Sasaki, Fukuoka-ken (JP);
Teruaki Santoki, Fukuoka-ken (JP);
Hiroshi Yamamoto, Yamaguchi-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 337 days.

(21) Appl. No.: 12/478,846

(22) Filed: Jun. 5, 2009

(65) Prior Publication Data

US 2009/0272940 A1    Nov. 5, 2009

Related U.S. Application Data

(63) Continuation-in-part of application No. PCT/JP2007/001365, filed on Dec. 6, 2007.

(30) Foreign Application Priority Data

Dec. 6, 2006  (JP) .................................. 2006-329878

(51) Int. Cl.
*H01B 1/02* (2006.01)
*H01B 1/08* (2006.01)
*H01M 4/58* (2010.01)
(52) U.S. Cl. ................. 252/518.1; 252/519.1; 429/231.3
(58) Field of Classification Search ............... 252/518.1, 252/519.1; 429/231.3
See application file for complete search history.

(56) References Cited

U.S. PATENT DOCUMENTS

| 7,846,586 B2* | 12/2010 | Maeda et al. ............... 429/231.3 |
| 7,879,494 B2* | 2/2011 | Nakura ........................ 429/231.3 |
| 2003/0044684 A1 | 3/2003 | Nanamoto et al. |
| 2006/0286457 A1* | 12/2006 | Sasaki ......................... 429/231.3 |
| 2007/0231694 A1* | 10/2007 | Abe et al. .................... 429/231.1 |
| 2007/0231695 A1* | 10/2007 | Kikuchi et al. ............. 429/231.1 |
| 2008/0090150 A1* | 4/2008 | Nakura ......................... 429/223 |

FOREIGN PATENT DOCUMENTS

| JP | 2001-266876 | 9/2001 |
| JP | 2004-342548 | 12/2004 |
| JP | 2004-355824 | 12/2004 |

OTHER PUBLICATIONS

International Search Report for PCT/JP2007/001365, mailed Feb. 26, 2008.

\* cited by examiner

*Primary Examiner* — Mark Kopec
*Assistant Examiner* — Jaison Thomas
(74) *Attorney, Agent, or Firm* — Nixon & Vanderhye P.C.

(57) ABSTRACT

The present invention relates to Li—Ni composite oxide particles for a non-aqueous electrolyte secondary cell which have a large charge/discharge capacity, an excellent packing density and excellent storage performance. The Li—Ni composite oxide particles for a non-aqueous electrolyte secondary cell which have a composition represented by the formula:

$$Li_xNi_{1-y-z}Co_yAl_zO_2$$

in which $0.9 < x < 1.3$; $0.1 < y < 0.3$; and $0 < z < 0.3$, wherein the composite oxide particles have a rate of change in specific surface area of not more than 10% as measured between before and after applying a pressure of 1 t/cm² thereto, and a sulfate ion content of not more than 1.0%, can be produced by mixing Ni—Co hydroxide particles having a sulfate ion content of not more than 1.0% whose surface is coated with an Al compound having a primary particle diameter of not more than 1 μm, with a lithium compound; and calcining the resulting mixture.

5 Claims, 4 Drawing Sheets

LI-NI COMPOSITE OXIDE PARTICLES FOR NON-AQUEOUS ELECTROLYTE SECONDARY CELL, PROCESS FOR PRODUCING THE SAME, AND NON-AQUEOUS ELECTROLYTE SECONDARY CELL

This application is a Continuation-In-Part of International Application No. PCT/JP2007/001365, filed 6 Dec. 2007, which designated the U.S. and claims priority of Japan Application Nos. 2006-329878, filed 6 Dec. 2006, the entire contents of each of which are all hereby incorporated herein by reference.

TECHNICAL FIELD

The present invention relates to Li—Ni composite oxide particles for a non-aqueous electrolyte secondary cell which provide a large charge/discharge capacity, packing density and storage performance.

BACKGROUND ART

With the recent rapid development of portable and cordless electronic devices such as audio-visual (AV) devices and personal computers, there is an increasing demand for secondary cells or batteries having a small size, a light weight and a high energy density as a power source for driving these electronic devices. Also, in consideration of global environments, electric cars and hybrid cars have been recently developed and put into practice, so that there is an increasing demand for lithium ion secondary cells for large size applications having excellent storage performance. Under these circumstances, lithium ion secondary cells having advantages such as large charge/discharge capacity and good storage performance have been noticed.

Hitherto, as cathode materials useful for high energy-type lithium ion secondary cells exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary cells using these cathode materials, lithium ion secondary cells using $LiNiO_2$ have been noticed because of large charge/discharge capacity thereof. However, the materials tend to be deteriorated in thermal stability and charge/discharge cycle durability upon charging, and, therefore, it has been required to further improve properties thereof.

Specifically, when lithium ions are de-intercalated from $LiNiO_2$, the crystal structure of $LiNiO_2$ suffers from Jahn-Teller distortion since $Ni^{3+}$ is converted into $Ni^{4+}$. When the amount of Li de-intercalated reaches 0.45, the crystal structure of such a lithium-de-intercalated region of $LiNiO_2$ is transformed from hexagonal system into monoclinic system, and a further de-intercalated of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary cell tends to suffer from poor cycle characteristics or occurrence of undesired reaction between $LiNiO_2$ and an electrolyte solution owing to release of oxygen therefrom, resulting in deterioration in thermal stability and storage performance of the cell. To solve these problems, there have been made studies on materials formed by adding Co and Al to a part of Ni of $LiNiO_2$. However, these materials have still failed to solve the above-described problems. Therefore, it has still been required to provide a Li—Ni composite oxide having a more stabilized crystal structure.

In addition, since the particles of the Li—Ni composite oxide have a small primary particle diameter, in order to obtain a Li—Ni composite oxide having a high packing density, it is required to control properties of the Li—Ni composite oxide such that they are capable of forming densely aggregated secondary particles. However, the Li—Ni composite oxide in the form of secondary particles tends to suffer from breakage of the secondary particles owing to compression upon production of an electrode therefrom and is, therefore, increased in surface area, so that the resulting secondary cell tends to undergo promoted reaction between the composite oxide and an electrolyte solution upon storage in a charged state under a high temperature condition, resulting in formation of a non-conductive material film on a surface of the electrode and, therefore, increase in electric resistance of the secondary cell. Also, when impurities such as lithium sulfate are present in the Li—Ni composite oxide, there tend to arise the problems such as incomplete crystal growth of the Li—Ni composite oxide and formation of a non-conductive material film on a surface of the electrode owing to undesirable decomposition reaction of the impurities during a charge/discharge cycle thereof, resulting in increase in electric resistance of the secondary cell upon storage in a charged state under a high temperature condition. For these reasons, in order to ensure high storage performance of the secondary cell under a high temperature condition, it is required to not only obtain a Li—Ni composite oxide having a less content of impurities, but also suppress change in average particle diameter of the cathode material between before and after compressing the material upon production of the electrode therefrom while maintaining a high electrode density, and prevent the particles thereof from suffering from breakage.

Further, in the process for producing the Li—Ni composite oxide, in order to obtain the Li—Ni composite oxide having a high packing density and a stable crystal structure, it is required to use Ni composite hydroxide particles which are well controlled in properties, crystallinity and contents of impurities, and calcine the particles under the condition which is free from inclusion of $Ni^{2+}$ into Li sites thereof.

More specifically, it is required to provide Li—Ni composite oxide capable of exhibiting a high packing density, a stable crystal structure and excellent storage performance as a cathode material for a non-aqueous electrolyte secondary cell.

Hitherto, in order to improve various properties such as stabilization of a crystal structure and charge/discharge cycle characteristics, various improvements of $LiNiO_2$ particles have been attempted. For example, there are known the technique of stabilizing a crystal structure of $LiNiO_2$ by adding other kinds of metals to Ni sites thereof (Patent Document 1); the technique of improving a tap density of Ni—Co hydroxide used for production of the Li—Ni composite oxide to reduce a content of residual impurities therein (Patent Document 2); the technique of controlling a cumulative volume-based particle size distribution of the Li—Ni composite oxide to a limited range to obtain a cathode material having a large volume (capacity) density, a high safety, an excellent coating uniformity, an excellent charge/discharge cycle durability and low-temperature performance (Patent Document 3); the technique of not only increasing a rate of occupation of Li sites in the Li—Ni composite oxide but also reducing an amount of change in BET specific surface area upon subjecting the Li—Ni composite oxide to wasting treatment to enhance an initial capacity thereof (Patent Document 4); etc.

Patent Document 1: Japanese Patent Application Laid-open (KOKAI) No. 5-242891 (1993)
Patent Document 2: Japanese Patent Application Laid-open (KOKAI) No. 2001-106534
Patent Document 3: PCT Pamphlet WO 01/092158
Patent Document 4: Japanese Patent Application Laid-open (KOKAI) No. 2004-171961

DISCLOSURE OF THE INVENTION

Problem to be Solved by the Invention

At present, it has been strongly required to provide the Li—Ni composite oxide as a cathode material for a non-aqueous electrolyte secondary cell which is capable of satisfying the above various properties. However, such a Li—Ni composite oxide has not been obtained until now.

That is, according to the technique described in the Patent Document 1, the other kinds of metals are added to LiNiO$_2$ to stabilize a structure thereof. However, in the technique, it may be difficult to prevent breakage of the particles owing to compression thereof upon production of an electrode therefrom, only by stabilizing a crystal structure of the LiNiO$_2$. As a result, the technique tends to be unsatisfactory to obtain LiNiO$_2$ having a high packing density, a stable crystal structure and excellent storage performance.

Also, according to the technique described in the Patent Document 2, the Ni—Co hydroxide used for production of the Li—Ni composite oxide is improved in tap density, and the content of residual impurity ions therein is reduced. However, in the technique, it may be difficult to prevent breakage of the particles owing to compression thereof upon production of an electrode therefrom, only by improving a tap density of the Ni—Co hydroxide. As a result, the technique also tends to be unsatisfactory to obtain LiNiO$_2$ having a high packing density, a stable crystal structure and excellent storage performance.

Further, according to the technique described in the Patent Document 3, the cumulative volume-based particle size distribution of the Li—Ni composite oxide is controlled to the specific limited range to obtain a cathode material having a large volume (capacity) density, a high safety, an excellent coating uniformity, an excellent charge/discharge cycle durability and excellent low-temperature performance. However, in the technique, it may be difficult to control a density of secondary particles thereof and prevent breakage of the particles owing to compression upon production of an electrode therefrom, only by controlling the cumulative volume-based particle size distribution of the Li—Ni composite oxide. As a result, the technique also tends to be unsatisfactory to obtain LiNiO$_2$ having a high packing density, a stable crystal structure and excellent storage performance.

In addition, according to the technique described in the Patent Document 4, the rate of occupation of Li sites in the Li—Ni composite oxide is increased and the amount of change in BET specific surface area of the Li—Ni composite oxide when subjected to washing treatment is reduced to enhance an initial capacity of the Li—Ni composite oxide. However, in the technique, it may be difficult to prevent breakage of the particles owing to compression upon production of an electrode therefrom, only by increasing the rate of occupation of Li sites in the Li—Ni composite oxide. As a result, the technique also tends to be unsatisfactory to obtain LiNiO$_2$ having a high packing density, a stable crystal structure and excellent storage performance.

In view of the above conventional problems, an object of the present invention is to provide a Li—Ni composite oxide having a high packing density, a stable crystal structure and excellent storage performance.

Means for Solving the Problem

The above-described technical task and object can be achieved by the following aspects of the present invention.

That is, in accordance with the present invention, in order to achieve the above object, in a non-aqueous electrolyte secondary cell comprising a negative electrode and a positive electrode which are formed from a material capable of de-intercalation/intercalation lithium ions, an active substance for the positive electrode comprises Li—Ni composite oxide particles for a non-aqueous electrolyte secondary cell which have a composition represented by the formula:

$$Li_xNi_{1-y-z}Co_yAl_zO_2$$

in which 0.9<x<1.3; 0.1<y<0.3; and 0<z<0.3, wherein the composite oxide particles have a rate of change in specific surface area of not more than 10% as measured between before and after applying a pressure of 1 t/cm$^2$ thereto, and a sulfate ion content of not more than 1.0% (Invention 1).

Also, in the present invention, there is provided the Li—Ni composite oxide particles for a non-aqueous electrolyte secondary cell as defined in the Invention 1, wherein the composite oxide particles have a density of not less than 2.85 g/mL as measured upon applying a pressure of 1 t/cm$^2$ thereto, and a sulfate ion content of not more than 1.0% (Invention 2).

Further, in the present invention, there is provided a process for producing the Li—Ni composite oxide particles as defined in claim 1 or 2, comprising the steps of:

mixing Ni—Co hydroxide particles having a sulfate ion content of not more than 1% whose surface is coated with an Al compound having a primary particle diameter of not more than 1 µm or a mixture of Ni—Co hydroxide particles having a sulfate ion content of not more than 1.0% and aluminum hydroxide having a sulfate ion content of not more than 0.1% and a primary particle diameter of not more than 1 µm, with a lithium compound; and calcining the resulting mixture (Invention 3).

Further, in the present invention, there is provided the process for producing the Li—Ni composite oxide particles as defined in claim 1 or 2, according to the Invention 3, wherein the lithium compound is lithium hydroxide, and a content of lithium carbonate in the lithium hydroxide is less than 5% (Invention 4).

In addition, in the present invention, there is provided a non-aqueous electrolyte secondary cell using a positive electrode comprising a cathode material comprising the Li—Ni composite oxide particles for a non-aqueous electrolyte secondary cell as defined in the Invention 1 or 2 (Invention 5).

Effect of the Invention

Since the Li—Ni composite oxide particles of the present invention have a rate of change in specific surface area of not more than 10% as measured between before and after applying a pressure of 1 t/cm$^2$ thereto, it is possible to reduce variation in properties thereof due to compression of the particles upon production of an electrode therefrom, suppress occurrence of the reaction between the electrode and an electrolyte solution upon storage under a high temperature condition, and prevent increase in electric resistance thereof after storage.

Also, since the Li—Ni composite oxide particles of the present invention have a density of not less than 2.85 g/mL as measured upon applying a pressure of 1 t/cm² thereto, it is possible to improve not only a packing density of the particles but also a capacity of the resulting cell per a unit volume thereof.

Further, since the Li—Ni composite oxide particles of the present invention are obtained by using Ni—Co hydroxide having a residual sulfate ion content of not more than 1.0% whose surface is coated with aluminum hydroxide having a primary particle diameter of not more than 1 μm, or a mixture of Ni—Co hydroxide particles having a sulfate ion content of not more than 1.0% and aluminum hydroxide having a sulfate ion content of not more than 0.1% and a primary particle diameter of not more than 1 μm, it is possible to produce Li—Ni composite oxide particles which are enhanced in safety upon charging and storage performance under a high temperature condition.

Therefore, the Li—Ni composite oxide particles of the present invention are suitable as a cathode material for a non-aqueous electrolyte secondary cell.

PREFERRED EMBODIMENT FOR CARRYING OUT THE INVENTION

Figure 1:
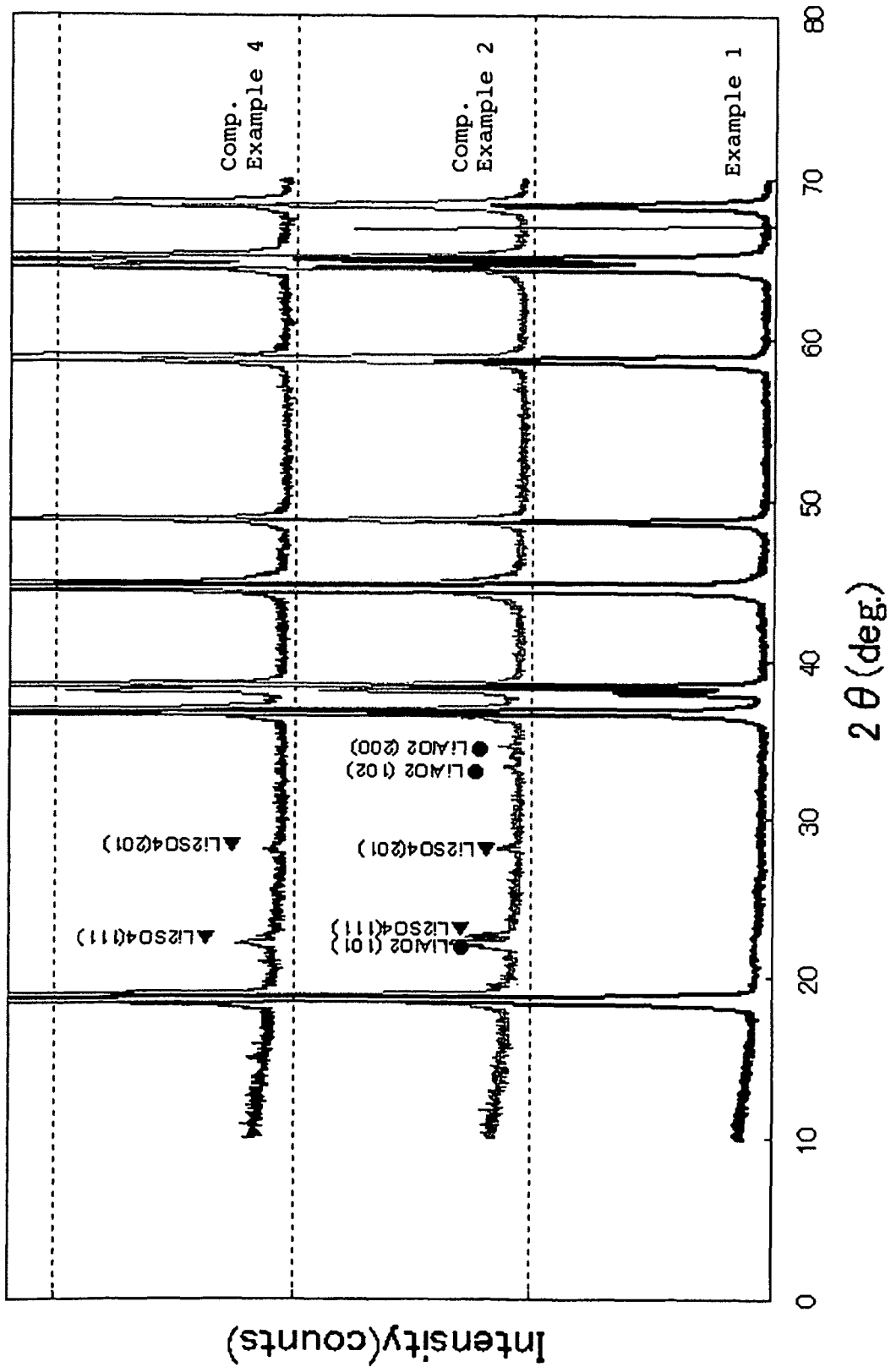
FIG. 1 is a view showing powder X-ray diffraction patterns of Li—Ni composite oxides obtained in Example 1 and Comparative Examples 2 and 4.

The present invention is described in detail below.

First, the Li—Ni composite oxide particles for a non-aqueous electrolyte secondary cell according to the present invention are described.

The Li—Ni composite oxide particles of the present invention have a composition represented by the formula:

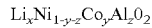

$$Li_xNi_{1-y-z}Co_yAl_zO_2$$

in which $0.9 < x < 1.3$; $0.1 < y < 0.3$; and $0 < z < 0.3$.

When x is out of the above-specified range, the obtained Li—Ni composite oxide particles may fail to exhibit a high cell capacity. It is preferred that x be in the range of $0.98 \leq x \leq 1.10$.

When y is not more than 0.1, it may be difficult to suppress occurrence of such a Jahn-Teller distortion in which $Ni^{3+}$ is converted into $Ni^{4+}$, and a charge/discharge efficiency of the resulting cell in an initial charge/discharge cycle tends to be deteriorated, so that the merit by the addition of cobalt tends to be lessened. When y is not less than 0.3, the content of cobalt having a high metal cost in the composite oxide particles tends to be increased, so that such an advantage that the metal cost of the Li—Ni composite oxide particles is lower than that of $LiCoO_2$ tends to be lessened, and further an initial charge/discharge capacity of the resulting cell tends to be considerably deteriorated. It is preferred that y be in the range of $0.12 \leq y \leq 0.25$.

When z is not less than 0.3, a true density of the cathode material tends to be lowered, so that it may be difficult to obtain a material having a high packing density. Further, a charge/discharge capacity of the resulting cell tends to be considerably deteriorated, so that such an advantage that the Li—Ni composite oxide particles exhibit a high charge/discharge capacity tends to be lessened. It is preferred that z be in the range of $0.01 \leq z \leq 0.20$.

The BET specific surface area of the Li—Ni composite oxide particles according to the present invention is preferably 0.1 to 1.6 m²/g. When the BET specific surface area of the Li—Ni composite oxide particles is less than 0.1 m²/g, it may be difficult to industrially produce such particles. When the BET specific surface area of the Li—Ni composite oxide particles is more than 1.6 m²/g, the particles tends to suffer from decrease in packing density and increase in reactivity with an electrolyte solution. The BET specific surface area of the Li—Ni composite oxide particles is more preferably 0.2 to 1.3 m²/g and still more preferably 0.3 to 1.0 m²/g.

The rate of change in specific surface area of the Li—Ni composite oxide particles according to the present invention as measured between before and after applying a pressure of 1 t/cm² thereto is not more than 10%, thereby enabling production of a non-aqueous electrolyte secondary cell having good storage performance. When the rate of change in specific surface area of the Li—Ni composite oxide particles is more than 10%, the reaction with an electrolyte solution tends to be promoted during storage under a high temperature condition, so that the increase in electric resistance thereof after storage tends to become more remarkable. The rate of change in specific surface area of the Li—Ni composite oxide particles is preferably 0 to 8%.

The content of residual sulfate ions in the Li—Ni composite oxide particles according to the present invention is not more than 1.6%, thereby enabling production of a non-aqueous electrolyte secondary cell having good storage performance. When the content of residual sulfate ions in the Li—Ni composite oxide particles is more than 1.0%, a crystal growth of the Li—Ni composite oxide particles tends to become incomplete, so that inclusion of impurities such as lithium sulfate in the composite oxide particles tends to occur, thereby causing a decomposition reaction of the impurities during the charge/discharge cycle of the obtained cell. As a result, the reaction with an electrolyte solution tends to be promoted during storage under a high temperature condition, so that the increase in electric resistance thereof after the storage tends to become more remarkable. The content of residual sulfate ions in the Li—Ni composite oxide particles is preferably 0 to 0.7%.

The compressed density of the Li—Ni composite oxide particles according to the present invention as measured upon applying a pressure of 1 t/cm² thereto is preferably not less than 2.85 g/mL. When the compressed density of the Li—Ni composite oxide particles is less than 2.85 g/mL, the cell capacity per a unit volume tends to be reduced, so that the advantage of a high charge/discharge capacity of the Li—Ni composite oxide particles according to the present invention tends to be lessened. The compressed density of the Li—Ni composite oxide particles is more preferably not less than 2.90 g/mL. The compressed density of the Li—Ni composite oxide particles is still more preferably as close to a true density thereof as possible.

The average particle diameter of the Li—Ni composite oxide particles according to the present invention is preferably 1.0 to 20 μm. When the average particle diameter of the Li—Ni composite oxide particles is less than 1.0 μm, the composite oxide particles tend to suffer from the problems such as decrease in packing density and increase in reactivity with an electrolyte solution. When the average particle diameter of the Li—Ni composite oxide particles is more than 20 µm, it may be difficult to industrially produce such particles. The average particle diameter of the Li—Ni composite oxide particles is more preferably 3.0 to 17.0 µm.

The rate of change (absolute value) in average particle diameter of the Li—Ni composite oxide particles according to the present invention as measured between before and after applying a pressure of 1 t/cm$^2$ thereto is preferably not more than 10%, thereby enabling production of a non-aqueous electrolyte secondary cell having good storage performance. When the rate of change in average particle diameter of the Li—Ni composite oxide particles is more than 10%, the reaction between the particles and an electrolyte solution upon storage under a high temperature condition tends to be promoted, and the increase in electric resistance thereof after the storage tends to become more remarkable. The rate of change in average particle diameter of the Li—Ni composite oxide particles is preferably 0 to 6.0%.

The Li—Ni composite oxide particles according to the present invention have a spherical shape, and preferably are of a shape having a less number of acute angle portions.

Next, the process for producing the Li—Ni composite oxide particles according to the present invention is described.

The Li—Ni composite oxide particles of the present invention can be produced by coating a surface of respective Ni—Co hydroxide particles with an Al compound having a primary particle diameter of not more than 1 µm, mixing the Al compound-coated particles with a lithium compound, and then calcining the resulting mixture.

The Ni—Co hydroxide particles used in the production process of the present invention can be produced as follows. That is, a solution prepared by mixing 0.1 to 2.0 mol of nickel sulfate with cobalt sulfate at a predetermined molar ratio and an aqueous ammonia solution having a concentration of 1.0 to 15.0 mol/L are simultaneously fed to a reaction vessel whose interior is always kept stirred, and a sodium hydroxide solution having a concentration of 0.1 to 2.0 mol/L is simultaneously fed to the reaction vessel such that the pH of the obtained mixture in the reaction vessel is adjusted to 10.0 to 12.0. The suspension overflowed from the reaction vessel is collected in a concentration vessel through an overflow pipe connected thereto. Then, while suitably controlling a concentration velocity in the concentration vessel, the suspension is circulated to the reaction vessel to conduct the reaction until the concentration of the Ni—Co hydroxide in the reaction vessel and a precipitation vessel reaches 2 to 4 mol/L, and allow the particles to undergo mechanical impingement therebetween for controlling a particle size thereof, thereby obtaining the aimed Ni—Co hydroxide particles.

The Ni—Co hydroxide particles used in the present invention preferably have an average particle diameter of 2 to 22 µm, a BET specific surface area of 1 to 15 m$^2$/g and a sulfate ion content of not more than 1.0%.

When coating the surface of the respective Ni—Co hydroxide particles with the Al compound having a primary particle diameter of not more than 1 µm, in order to control a concentration of by-products in a water suspension comprising the above obtained Ni—Co hydroxide particles, the water suspension is preferably washed or diluted with water in an amount of 0.1 to 10 times the weight of the Ni—Co hydroxide particles using a filter press, a vacuum filter, a filter thickener or the like.

Thereafter, simultaneously with addition of an aluminum salt or an aqueous solution thereof to the suspension, a neutralizing aqueous solution is added thereto to control the pH of the reaction solution and the concentration of the suspension. Further, in order to remove co-existing soluble salts produced upon the addition of the aluminum salt, the slurry of the Ni—Co hydroxide particles whose surface is covered with aluminum hydroxide is washed with water in an amount of 1 to 10 times the weight of the slurry using a filter press, a vacuum filter, a filter thickener or the like, and then dried, thereby coating the surface of the respective Ni—Co hydroxide particles with aluminum hydroxide.

In this case, the concentration of the co-existing soluble salts in the suspension is preferably not more than 2% and more preferably not more than 1%. When the concentration of the co-existing soluble salts is more than 2%, the co-existing soluble salts generated upon production of the Ni—Co hydroxide tend to inhibit production of aluminum hydroxide having a primary particle diameter of not more than 1 µm, so that it may be difficult to uniformly coat the surface of the respective Ni—Co hydroxide particles as a core therewith. In addition, sodium sulfate tends to be incorporated into the aluminum hydroxide having a primary particle diameter of not more than 1 µm, so that the content of residual sulfate ions in the Ni—Co hydroxide tends to be increased.

The pH of the suspension upon adding the aluminum salt thereto may be adjusted to the range of 10 to 12. When the pH of the suspension is out of the above-specified range, it may be difficult to uniformly coat the surface of the respective Ni—Co hydroxide particles with aluminum hydroxide having a primary particle diameter of not more than 1 µm.

The suspension is preferably maintained at a temperature of 40 to 60° C.

Examples of the aluminum salt include sodium aluminate and aluminum sulfate. Examples of the neutralizing aqueous solution include aqueous solutions of sulfuric acid, nitric acid, hydrochloric acid and sodium hydroxide.

The aluminum salt may be added in an amount of preferably 1 to 20 mol % and more preferably 2 to 5 mol % in terms of Al per 1 mol of the Ni—Co hydroxide in the suspension.

The Ni—Co hydroxide particles whose surface is coated with the Al compound having a primary particle diameter of not more than 1 µm preferably have an average particle diameter of 2 to 20 µm, a BET specific surface area of 0.2 to 15.0 m$^2$/g and a sulfate ion content of not more than 1.0%.

The Al compound coated on the Ni—Co hydroxide particles preferably has a primary particle diameter of not more than 1 µm. When the primary particle diameter of the Al compound coated is more than 1 µm, the growth of a crystal structure of the Li—Ni composite oxide tends to become incomplete, and inclusion of impurities such as lithium aluminate in the resulting the Li—Ni composite oxide particles tends to occur.

The Ni—Co hydroxide particles whose surface is coated with the Al compound having a primary particle diameter of not more than 1 µm preferably have a residual sulfate ion content of not more than 1.0%. When the residual sulfate ion content in the coated Ni—Co hydroxide particles is more than 1.0%, the growth of a crystal structure of the Li—Ni composite oxide tends to become incomplete, and inclusion of impurities such as lithium sulfate in the resulting Li—Ni composite oxide particles tends to occur. The residual sulfate ion content in the coated Ni—Co hydroxide particles is more preferably not more than 0.70%.

Next, the Ni—Co hydroxide particles whose surface is coated with the Al compound having a primary particle diameter of not more than 1 µm is mixed with a lithium compound, and then the resulting mixture is calcined.

Meanwhile, in the present invention, a mixture of Ni—Co hydroxide particles and aluminum hydroxide may be used in place of the Ni—Co hydroxide particles whose surface is coated with the Al compound having a primary particle diameter of not more than 1 μm, and may be mixed with the lithium compound, followed by calcining the resulting mixture.

In this case, the residual sulfate ion content in the Ni—Co hydroxide particles used in the mixture is not more than 1.0% and preferably not more than 0.7%. In addition, the residual sulfate ion content in aluminum hydroxide used in the mixture is not more than 0.1% and preferably not more than 0.05%.

The Al compound (aluminum hydroxide) to be mixed has an average particle diameter of not more than 5 μm and preferably not more than 2 μm.

The crystal structure of the Al compound to be coated or mixed may be crystalline or non-crystalline as long as the primary particle diameter thereof is not more than 1 μm.

The mixing treatment for mixing the Ni—Co hydroxide particles whose surface is coated with the Al compound having a primary particle diameter of not more than 1 μm or the mixture of Ni—Co hydroxide particles and aluminum hydroxide having a primary particle diameter of not more than 1 μm, with the lithium compound may be conducted by either a dry method or a wet method as long as a uniform mixture is obtained.

The mixing molar ratio of the lithium compound to whole metals contained in the Ni—Co hydroxide particles whose surface is coated with the Al compound having a primary particle diameter of not more than 1 μm or the mixture of Ni—Co hydroxide particles and aluminum hydroxide is preferably 0.98 to 1.10.

The lithium compound used above is lithium hydroxide. The lithium hydroxide preferably has a lithium carbonate content of less than 5%. When the lithium carbonate content is not less than 5%, lithium carbonate tends to remain as impurity in the produced Li—Ni composite oxide, so that the obtained cell tends to be deteriorated in initial charge/discharge capacity, and the lithium carbonate tends to be decomposed upon charging the cell, resulting in generation of gases.

Also, the average particle diameter of lithium hydroxide used above is preferably not more than 50 μm and more preferably not more than 30 μm. When the average particle diameter of lithium hydroxide is not less than 50 μm, it may be difficult to uniformly mix such a lithium hydroxide with the Ni—Co hydroxide particles whose surface is coated with the Al compound having a primary particle diameter of not more than 1 μm or the mixture of Ni—Co hydroxide particles and aluminum hydroxide having a primary particle diameter of not more than 1 μm, thereby failing to obtain the Li—Ni composite oxide particles having a good crystallinity.

The calcining temperature is preferably 650 to 900° C. When the calcining temperature is less than 650° C., the reaction between Li and Ni may fail to proceed sufficiently, so that the growth of primary particles of the Li—Ni composite oxide particles tends to become insufficient. When the calcining temperature is more than 900° C., $Ni^{3+}$ tends to be reduced into $Ni^{2+}$ which may be undesirably mixed in the Li layer. The atmosphere used upon calcination is preferably an oxidative gas atmosphere and more preferably such an atmosphere having an oxygen concentration of not less than 70%. The calcining time is preferably 5 to 20 hr.

Next, the positive electrode using the cathode material comprising the Li—Ni composite oxide particles according to the present invention is described.

When producing the positive electrode using the cathode material according to the present invention, a conducting agent and a binder are added to the cathode material by an ordinary method. Examples of the preferred conducting agent include acetylene black, carbon black and graphite. Examples of the preferred binder include polytetrafluoroethylene and polyvinylidene fluoride.

The secondary cell produced by using the cathode material according to the present invention comprises the above positive electrode, a negative electrode and an electrolyte.

Examples of a negative electrode active substance which may be used for the negative electrode include metallic lithium, lithium/aluminum alloy, lithium/tin alloy, graphite and natural graphite.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphorus hexafluoride as well as at least one lithium salt selected from the group consisting of lithium perchlorate and lithium borate tetrafluoride in the above solvent.

The secondary cell produced by using the cathode material according to the present invention has an initial discharge capacity of about 160 to 195 mAh/g, and exhibits such an excellent property as specified by a rate of increase in electric resistance of not more than 120% as measured after storage under a high temperature condition by the below-mentioned evaluation method. The rate of increase in electric resistance of the secondary cell is preferably not more than 110%, and more preferably as close to 100% as possible.

<Function>

The deterioration due to storage of the non-aqueous electrolyte secondary cell includes the increase in electric resistance value thereof. The increase in electric resistance value of the non-aqueous electrolyte secondary cell may be caused by (1) a non-conductive layer on the surface of the electrode which may be formed by reacting the active substance kept under structurally unstable charged condition with the electrolyte solution; (2) a non-conductive layer on the surface of the electrode which may be formed by decomposing impurities in the active substance during charge/discharge cycle of the cell; (3) a non-conductive layer on a surface of the electrode which may be formed by reacting the electrolyte solution with a highly active surface of the active substance which is exposed outside owing to breakage of the active substance when subjected to rolling upon production of the electrode; etc.

In order to suppress the above problem (1), it is important to well control compositions of the respective components, and the attempt for solving the problem is described in the prior art (Patent Document 1), etc. Also, in order to suppress the above problem (2), it is important to well control the amounts of impurities, and the attempt for solving the problem is described in the prior art (Patent Document 2), etc. However, each of the techniques described in these prior arts tends to be unsatisfactory by itself to suppress the increase in electric resistance value of the cell. In order to obtain the aimed cell, it is required to satisfy the conditions capable of solving above problems (1) to (3) at the same time.

For this reason, in the present invention, the rate of change in specific surface area of the Li—Ni composite oxide particles having a residual sulfate ion content of not more than 1.0% as measured between before and after applying a pressure of 1 t/cm² thereto is controlled to not more than 10% to suppress formation of a newly exposed surface of the electrode upon compression or molding. As a result, it is possible to reduce variation of properties due to compression upon production of the electrode, suppress the reaction between the electrode and the electrolyte solution during storage under a high temperature condition, and prevent the increase in electric resistance of the cell after storage.

In addition, since the Li—Ni composite oxide particles of the present invention have a density of not less than 2.85 g/mL as measured upon applying a pressure of 1 t/cm² thereto, the composite oxide particles can be improved in packing density, thereby enhancing a cell capacity per a unit volume thereof.

Further, since the Li—Ni composite oxide particles of the present invention are produced from the Ni—Co hydroxide particles coated with aluminum hydroxide having a primary particle diameter of not more than 1 μm, it is possible to improve a safety of the resulting cell upon charging.

Meanwhile, the reason why the Li—Ni composite oxide particles of the present invention can exhibit the above advantages, is considered by the present inventors as follows. That is, since the dense surface of the respective Ni—Co hydroxide particles having a residual sulfate ion content of not more than 1.0% is coated with aluminum hydroxide having a primary particle diameter of not more than 1 μm, and further since the Li material having a less lithium carbonate content is used as the raw material, the reaction therebetween can proceed uniformly, so that it is possible to produce Li—Ni composite oxide particles having a high crystallinity.

EXAMPLES

The present invention is described in more detail below by Examples, but the Examples are only illustrative and, therefore, not intended to limit the scope of the present invention. Measuring methods and evaluation methods used in the following Examples and Comparative Examples are described below.

(1) Average Particle Diameter:

The average particle diameter is a volume-average particle diameter as measured by a wet laser method using a laser type particle size distribution measuring apparatus "LMS-30" manufactured by Seishin Kigyo Co., Ltd.

(2) Specific Surface Area:

The specific surface area was determined as follows. That is, after drying and deaerating a sample at 250° C. for 15 min under a mixed gas of 30% of nitrogen and 70% of helium, the specific surface of the sample was measured by a BET one-point continuous method using "MONOSORB" manufactured by Yuasa Ionix Co., Ltd.

(3) Compression Density:

The compression density of a sample was the density as measured upon applying a pressure of 1 t/cm² to the sample.

(4) Specific Surface Area after Compression:

The specific surface area after compression of a sample was the specific surface area as measured after applying a pressure of 1 t/cm² to the sample, crushing the sample with a mortar and then allowing the crushed sample to pass through a 45 μm-mesh sieve.

(5) Average Particle Diameter after Compression:

The average particle diameter after compression of a sample was the average particle diameter as measured after applying a pressure of 1 t/cm² to the sample, crushing the sample with a mortar and then allowing the crushed sample to pass through a 45 μm-mesh sieve.

(6) Primary Particle Diameter:

The primary particle diameter of a sample was a size of primary particles forming secondary particles of the sample as measured by observing the sample using a scanning electron microscope "SEM-EDX" equipped with an energy disperse type X-ray analyzer (manufactured by Hitachi High-Technologies Corp.).

(7) Sulfate Ion Content:

The sulfate ion content of a sample was the sulfate ion content in terms of a sulfur content therein as measured by burning the sample under an oxygen gas flow in a combustion furnace, using a carbon and sulfur content measuring apparatus "EMIA-520" manufactured by Horiba Seisakusho Co., Ltd.

(8) X-Ray Diffraction:

The X-ray diffraction of a sample was carried out under the conditions of Cu-Kα, 40 kV and 40 mA using an X-ray Diffraction Analyzer "RINT-2000" manufactured by Rigaku Co., Ltd.

(9) Evaluation of Initial Charge/Discharge Characteristics and Storage Performance Under a High Temperature Condition:

The coin cell produced by the following method using the Li—Ni composite oxide particles was evaluated for initial charge/discharge characteristics and storage performance under a high temperature condition.

First, 90% by weight of the Li—Ni composite oxide as a cathode material, 3% by weight of acetylene black and 3% by weight of a graphite "KS-16" both serving as a conducting material, and 4% by weight of polyvinylidene fluoride dissolved in N-methylpyrrolidone as a binder, were mixed with each other, and the resulting mixture was applied onto an Al metal foil and then dried at 150° C. The thus obtained sheets were blanked into 16 mmϕ and then compression-bonded to each other under a pressure of 1 t/cm², thereby producing an electrode having a thickness of 50 μm and using the thus produced electrode as a positive electrode. A metallic lithium blanked into 16 mmϕ was used as a negative electrode, and a solution prepared by mixing EC and DMC each comprising 1 mol/L of LiPF$_6$ with each other at a volume ratio of 1:2 was used as an electrolyte solution, thereby producing a coin cell of a CR2032 type.

The initial charge/discharge characteristics of the cell were determined as follows. That is, under a room temperature condition, the cell was charged at rate of 0.2 MA/cm² up to 4.3 V and then discharged at a rate of 0.2 mA/cm² to 3.0 V to measure an initial charge capacity, an initial discharge capacity and an initial efficiency of the cell.

The storage performance under a high temperature condition of the cell were determined as follows. That is, under a room temperature condition, the cell was first subjected to initial charge/discharge cycle and then charged until reaching 4.1 V to measure a D.C. resistance under this voltage.

Next, the cell after subjected to the above measurement was preserved under the environmental condition of 60° C. for one week and then subjected again to measurement of the D.C. resistance, thereby evaluating the change in electric resistance of the cell between before and after being stored under a high temperature condition.

The evaluation for safety of the Li—Ni composite oxide particles was carried out as follows. That is, the coin cell of a CR2032 type was produced in the same manner as in the evaluation for initial charge/discharge characteristics, and subjected to initial charge/discharge cycle. Then, the cell was subjected to the second charging at such a current as to complete charging of the cell up to 4.3 V for 10 hr. The coin cell was disassembled while being kept under the above charged state to dismount the positive electrode therefrom. The positive electrode thus dismounted was received in a sealed state in an Al pressure cell under the co-existence of the electrolyte solution, and then subjected to differential scanning calorimetry over the range of from room temperature to 400° C. at a scanning speed of 5° C./min.

Example 1

An aqueous solution prepared by mixing 2 mol/L of nickel sulfate with cobalt sulfate at a mixing ratio of Ni:Co of 84:16, and a 5.0 mol/L ammonia aqueous solution were simultaneously fed to a reaction vessel.

The contents of the reaction vessel were always kept stirred by a blade-type stirrer and, at the same time, the reaction vessel was automatically supplied with a 2 mol/L sodium hydroxide aqueous solution so as to control the pH of the contents in the reaction vessel to 11.5±0.5. The Ni—Co hydroxide produced in the reaction vessel was overflowed therefrom through an overflow pipe, and collected in a concentration vessel connected to the overflow pipe to concentrate the Ni—Co hydroxide. The concentrated Ni—Co hydroxide was circulated to the reaction vessel, and the reaction was continued for 40 hr until the concentration of the Ni—Co hydroxide in the reaction vessel and a precipitation vessel reached 4 mol/L.

After completion of the reaction, the resulting suspension was withdrawn from the reaction vessel, and washed with water in an amount of 5 times the amount of the suspension using a filter press, and further subjected to deaggregation to adjust a concentration of the Ni—Co hydroxide in the suspension to 0.2 mol/L. The concentration of co-existing soluble salts in a filtrate obtained immediately before completion of the water-washing, was measured using an infrared moisture meter. As a result, it was confirmed that the concentration of co-existing soluble salts in the suspension was 1.5%. A 0.2 mol/L sodium aluminate aqueous solution was continuously fed to the suspension in the reaction vessel such that a molar ratio of (Ni+Co):Al in the resulting mixture was 95:5. The contents of the reaction vessel were always kept stirred by the stirrer and, at the same time, a 0.2 mol/L sulfuric acid aqueous solution was automatically supplied thereto so as to control the pH of the contents of the reaction vessel to 10.5±0.5, thereby obtaining the suspension comprising the Ni—Co hydroxide particles coated with aluminum hydroxide.

The resulting suspension was washed with water in an amount of 10 times the weight of the Ni—Co hydroxide particles in the suspension using a filter press, and then dried, thereby obtaining the Ni—Co hydroxide particles coated with aluminum hydroxide which had a molar ratio of Ni:Co:Al of 80:15:5. The surface of the respective Ni—Co hydroxide particles before and after coated with aluminum hydroxide was observed using SEM-EDX. As a result, it was confirmed that the aluminum hydroxide coated on the Ni—Co hydroxide particles had a primary particle diameter of 0.1 μm.

The resulting Al-coated Ni—Co hydroxide particles were mixed with lithium hydroxide monohydrate having a lithium carbonate content of 0.3% by weight and an average particle diameter of 20 μm whose particle size was previously controlled by a crusher, such that a molar ratio of Li/(Ni+Co+Al) in the resulting mixture was 1.02.

The resulting mixture was calcined in an oxygen atmosphere at 750° C. for 10 hr, and then deaggregated and pulverized. As a result, it was confirmed that the obtained calcined product had a chemical composition of $Li_{1.02}Ni_{0.8}Co_{0.15}Al_{0.05}O_2$ and an average particle diameter of 6.3 μm. The sulfur content in the resulting Li—Ni composite oxide particles was measured by the above-described method and converted into amount of sulfate ions to determine the residual sulfate ion content therein. As a result, it was confirmed that the residual sulfate ion content in the Li—Ni composite oxide particles was 0.56%. In addition, the sulfate ion content in the Li—Ni composite oxide was measured by ion chromatography. As a result, it was confirmed that the sulfate ion content was 0.55% and, therefore, a whole amount of the sulfur component was present in the form of a sulfate ion.

Example 2

The same procedure as defined in Example 1 was conducted except that a sodium aluminate aqueous solution was continuously fed to the reaction vessel such that a molar ratio of (Ni+Co):Al in the resulting mixture was 97:3, thereby obtaining Li—Ni composite oxide particles having a chemical composition of $Li_{1.02}Ni_{0.82}Co_{0.15}Al_{0.03}O_2$.

Example 3

The same procedure as defined in Example 1 was conducted except that the concentration of the mixed aqueous solution of nickel sulfate and cobalt sulfate, the concentration of the ammonia aqueous solution, the pH upon the reaction, and the concentration velocity in the concentration vessel, were varied, thereby obtaining Li—Ni composite oxide particles having a chemical composition of $Li_{1.02}Ni_{0.8}Co_{0.15}Al_{0.05}O_2$ and an average particle diameter of 14.5 μm.

Example 4

The Al-coated Ni—Co hydroxide particles obtained in Example 1 were mixed with lithium hydroxide monohydrate having a lithium carbonate content of 1.0% by weight and an average particle diameter of 20 μm such that a molar ratio of Li/(Ni+Co+Al) in the resulting mixture was 1.02.

The subsequent procedure was conducted in the same manner as defined in Example 1, thereby obtaining Li—Ni composite oxide particles having a chemical composition of $Li_{1.02}Ni_{0.8}Co_{0.15}Al_{0.05}O_2$.

Example 5

The suspension of Ni—Co hydroxide obtained in Example 1 was washed with water in an amount of 10 times the weight of the Ni—Co hydroxide using a filter press, and then dried, thereby obtaining Ni—Co hydroxide particles having a residual sulfate ion content of 0.46% and a molar ratio of Ni:Co of 84.2:15.8.

The resulting Ni—Co hydroxide particles were mixed with aluminum hydroxide having a primary particle diameter of 0.5 μm, an average particle diameter of 1.5 μm and a residual sulfate ion content of 0.05%, and lithium hydroxide monohydrate having a lithium carbonate content of 0.3% by weight and an average particle diameter of 20 μm such that a molar ratio of Li/(Ni+Co+Al) in the resulting mixture was 1.02.

The subsequent procedure was conducted in the same manner as defined in Example 1, thereby obtaining Li—Ni composite oxide particles having a chemical composition of $L_{1.02}Ni_{0.8}Co_{0.05}Al_{0.05}O_2$.

Comparative Example 1

An acid aqueous solution comprising 2 mol/L of nickel sulfate, cobalt sulfate, aluminum sulfate and 1 mol/L of ammonia was prepared such that a molar ratio of Ni:Co:Al in the solution was 80:15:5. After mixing, the solution was fed to a reaction vessel whose interior was always kept stirred by a blade-type stirrer. At the same time, 2.0 mol/L of sodium hydroxide was fed to the reaction vessel so as to control the pH of the contents in the reaction vessel to 10.5±0.5. The Ni—Co—Al composite hydroxide produced in the reaction vessel was overflowed and continuously withdrawn therefrom. The resulting suspension was washed with water in an amount of 10 times the weight of the Ni—Co—Al composite hydroxide using a filter press, and then dried, thereby obtaining Ni—Co—Al composite hydroxide having a molar ratio of Ni:Co:Al of 80:15:5.

The subsequent procedure was conducted in the same manner as defined in Example 1, thereby obtaining Li—Ni composite oxide particles having a chemical composition of $Li_{1.02}Ni_{0.8}Co_{0.15}Al_{0.05}O_2$.

Comparative Example 2

The suspension of Ni—Co hydroxide before washing obtained in Example 1 in which by-products coexisted, was diluted with water until the concentration of the coexisting soluble salts in the suspension reached 10%. Then, an sodium aluminate aqueous solution was continuously fed to the suspension in the reaction vessel such that a molar ratio of (Ni+Co):Al in the resulting mixture was 95:5. While always stirring an interior of the reaction vessel by a blade-type stirrer, at the same time, a sulfuric acid aqueous solution was automatically supplied thereto to control the pH of the contents in the reaction vessel to 10.5±0.5, thereby obtaining a suspension comprising Ni—Co hydroxide coated with aluminum hydroxide.

The resulting suspension was washed with water, and then dried, thereby obtaining Ni—Co hydroxide particles coated with aluminum hydroxide having a molar ratio of Ni:Co:Al of 80:15:5. The surface of the respective Ni—Co hydroxide particles before and after coated with aluminum hydroxide was observed using SEM-EDX. As a result, it was confirmed that the aluminum hydroxide coated on the Ni—Co hydroxide particles had a primary particle diameter of 0.1 μm.

The subsequent procedure was conducted in the same manner as defined in Example 1, thereby obtaining Li—Ni composite oxide particles having a chemical composition of $Li_{1.02}Ni_{0.8}Co_{0.15}Al_{0.05}O_2$.

Comparative Example 3

The suspension of Ni—Co hydroxide particles obtained in Example 1 was washed with water in an amount of 10 times the weight of the Ni—Co hydroxide using a filter press, and then dried, thereby obtaining Ni—Co hydroxide particles having a residual sulfate ion content of 0.56% and a molar ratio of Ni:Co of 84.2:15.8.

The resulting Ni—Co hydroxide particles were mixed with aluminum hydroxide having a primary particle diameter of 2.0 μm, an average particle diameter of 7.2 μm and a residual sulfate ion content of 0.05%, and lithium hydroxide monohydrate having a lithium carbonate content of 0.3% by weight and an average particle diameter of 20 μm such that a molar ratio of Li/(Ni+Co+Al) in the resulting mixture was 1.02.

The subsequent procedure was conducted in the same manner as defined in Example 1, thereby obtaining Li—Ni composite oxide particles having a chemical composition of $Li_{1.02}Ni_{0.8}Co_{0.15}Al_{0.02}O_2$.

Comparative Example 4

A sodium aluminate aqueous solution was continuously fed to the suspension of Ni—Co hydroxide obtained in Example 1 in the reaction vessel such that a molar ratio of (Ni+Co):Al in the resulting mixture was 95:5. While always stirring an interior of the reaction vessel by a blade-type stirrer, at the same time, a sulfuric acid aqueous solution was automatically supplied thereto to control the pH of the contents in the reaction vessel to 9.0±0.5, thereby obtaining a suspension comprising Ni—Co hydroxide coated with aluminum hydroxide.

The resulting suspension was washed with water, and then dried, thereby obtaining Ni—Co hydroxide particles coated with aluminum hydroxide having a molar ratio of Ni:Co:Al of 80:15:5. The thus obtained particles had a residual sulfate ion content of 1.15%. The surface of the respective Ni—Co hydroxide particles before and after coated with aluminum hydroxide was observed using SEM-EDX. As a result, it was confirmed that the aluminum hydroxide coated on the Ni—Co hydroxide particles had a primary particle diameter of 0.1 μm.

The subsequent procedure was conducted in the same manner as defined in Example 1, thereby obtaining Li—Ni composite oxide particles having a chemical composition of $Li_{1.02}Ni_{0.8}Co_{0.15}Al_{0.05}O_2$.

Comparative Example 5

The Ni—Co hydroxide particles obtained in Example 1 which were coated with aluminum hydroxide were mixed with lithium hydroxide monohydrate having a lithium carbonate content of 5.3% by weight and an average particle diameter of 20 μm such that a molar ratio of Li/(Ni+Co+Al) in the resulting mixture was 1.02.

The subsequent procedure was conducted in the same manner as defined in Example 1, thereby obtaining Li—Ni composite oxide particles having a chemical composition of $Li_{1.02}Ni_{0.8}Co_{0.15}Al_{0.05}O_2$.

The average particle diameter, specific surface area, density upon compression, and specific surface area after compression as well as rate of change in the specific surface area, of the Li—Ni composite oxide particles obtained in Examples 1 to 3 and 5 and Comparative Example 1 are shown in Table 1.

TABLE 1

|  | Li/M ratio | Ni | Co | Al |
|---|---|---|---|---|
| Example 1 | 1.02 | 0.80 | 0.15 | 0.05 |
| Example 2 | 1.02 | 0.82 | 0.15 | 0.03 |
| Example 3 | 1.02 | 0.80 | 0.15 | 0.05 |
| Example 5 | 1.02 | 0.80 | 0.15 | 0.05 |
| Comparative Example 1 | 1.02 | 0.80 | 0.15 | 0.05 |

TABLE 1-continued

|  | Average particle diameter (μm) | Average particle diameter after compressed (μm) | Rate of change in average particle diameter between before and after compressed (%) |
| --- | --- | --- | --- |
| Example 1 | 6.3 | 6.0 | −5.00 |
| Example 2 | 6.2 | 6.0 | −3.33 |
| Example 3 | 14.5 | 14.3 | −1.38 |
| Example 5 | 6.2 | 6.0 | −3.33 |
| Comparative Example 1 | 5.2 | 4.5 | −13.46 |

|  | BET specific surface area ($m^2/g$) | BET specific surface area after compressed ($m^2/g$) | Rate of change in BET specific surface area between before and after compressed (%) | Compressed density (g/mL) |
| --- | --- | --- | --- | --- |
| Example 1 | 0.41 | 0.42 | 2.44 | 2.98 |
| Example 2 | 0.48 | 0.50 | 4.17 | 3.00 |
| Example 3 | 0.23 | 0.24 | 4.35 | 3.16 |
| Example 5 | 0.47 | 0.49 | 4.25 | 3.01 |
| Comparative Example 1 | 0.65 | 0.86 | 32.31 | 2.80 |

The residual sulfate ion content and D.C. resistance of the obtained particles were measured by the above-described methods to evaluate their storage performance under a high temperature condition. The results are shown in Table 2.

TABLE 2

|  | Sulfate ion content in Ni—Co hydroxide and aluminum hydroxide (%) | Residual sulfate ion content in Li—Ni composite oxide (%) | Rate of increase in D.C. resistance (%) |
| --- | --- | --- | --- |
| Example 1 | 0.56 | 0.55 | 107.0 |
| Example 2 | 0.62 | 0.62 | 112.2 |
| Example 3 | 0.58 | 0.56 | 110.8 |
| Example 5 | 0.46 | 0.48 | 110.2 |
| Comparative Example 1 | 3.16 | 3.11 | 142.1 |
| Comparative Example 2 | 1.65 | 1.59 | 134.2 |
| Comparative Example 4 | 1.15 | 1.12 | 128.3 |

The Li—Ni composite oxide particles obtained in Examples 1 to 5 all had a rate of change in specific surface area between before and after compressed of not more than 10%, and were prevented from suffering from breakage of particles upon production of an electrode therefrom. Therefore, it was conformed that these Li—Ni composite oxide particles were capable of providing a positive electrode material which was improved in a rate of increase in D.C. resistance, and exhibited a suppressed reactivity with an electrolyte solution under a high-temperature environmental condition as well as excellent storage performance.

In addition, the Li—Ni composite oxide particles obtained in Examples 1 to 5 all had a rate of change in average particle diameter after compressed of not more than 5%, and were prevented from suffering from breakage of particles upon production of an electrode therefrom. Therefore, it was conformed that these Li—Ni composite oxide particles were capable of providing a positive electrode material which was improved in a rate of increase in D.C. resistance, and exhibited a suppressed reactivity with an electrolyte solution under a high-temperature environmental condition as well as excellent storage performance.

Further, the Li—Ni composite oxide particles obtained in Examples 1 to 5 all had a density upon compression of not less than 2.98 $g/cm^3$ and, therefore, were a material exhibiting an excellent packing density per a unit volume.

Next, the powder X-ray diffraction patterns of the Li—Ni composite oxide particles obtained in Example 1 and Comparative Examples 2 and 4 are shown in FIG. 1.

As is apparent from FIG. 1, it was confirmed that, in Example 1, no peak owing to by-products was observed, and the resulting particles were in the form of a uniform solid solution having a layer structure. On the other hand, in Comparative Examples 2 and 4, different phase peaks attributed to lithium aluminate and lithium sulfate were observed.

Figure 2:
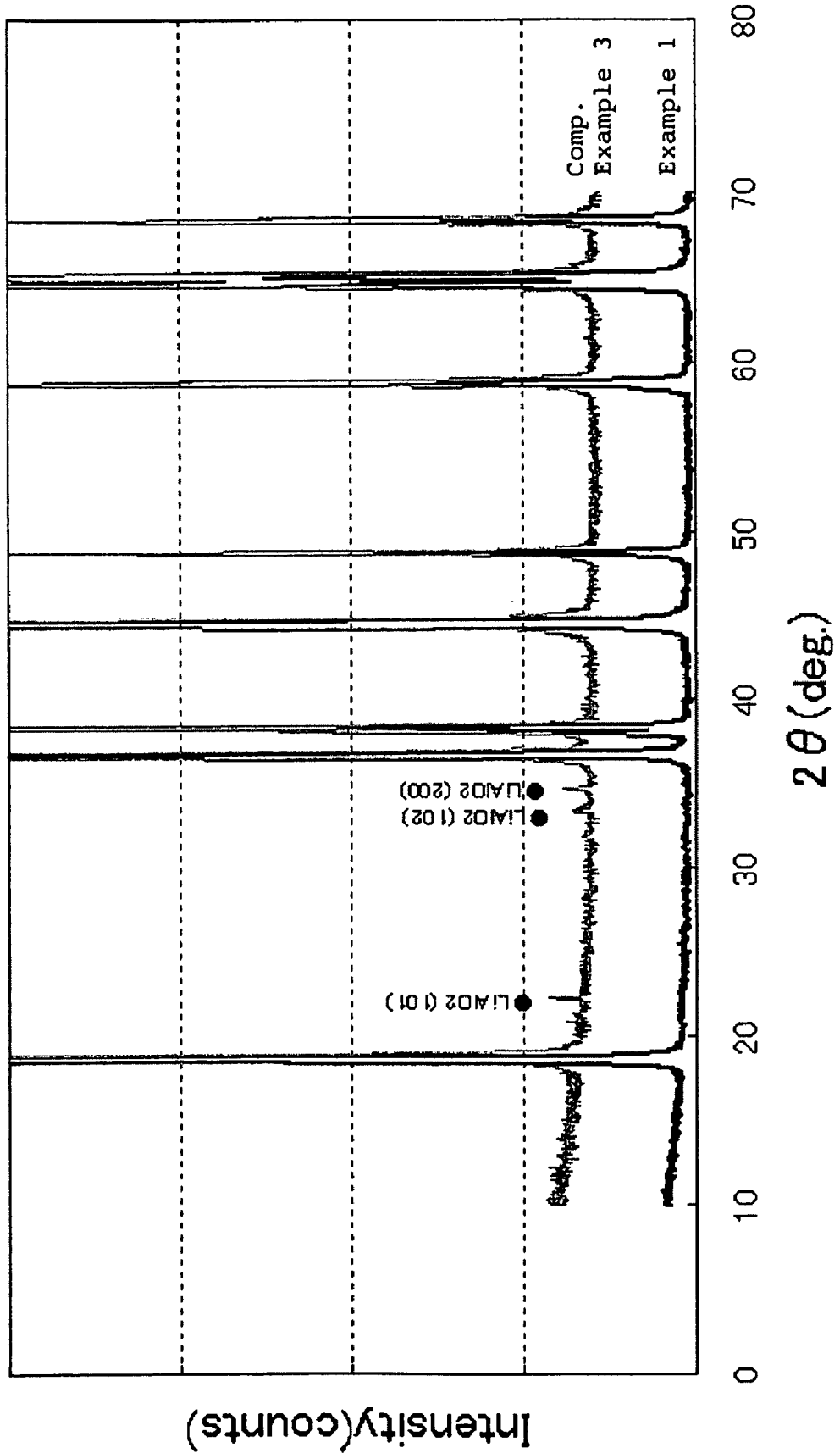
FIG. 2 is a view showing powder X-ray diffraction patterns of Li—Ni composite oxides obtained in Example 1 and Comparative Example 3.

Next, the powder X-ray diffraction patterns of the Li—Ni composite oxides obtained in Example 1 and Comparative Example 3 are shown in FIG. 2.

From FIG. 2, it was confirmed that, in Example 1, no peak owing to by-products was observed, and the resulting particles were in the form of a uniform solid solution having a layer structure, whereas in Comparative Example 3, a different phase peak attributed to lithium aluminate was observed.

Next, coin cells were respectively produced from the Li—Ni composite oxide particles obtained in Examples 1 to 3 and Comparative Example 2, and subjected to evaluation of initial charge/discharge characteristics. Also, the Li—Ni composite oxides obtained in Example 1 and Comparative Example 2 were subjected to differential scanning calorimetry to measure a heat-generation initiating temperature thereof. These results are shown in Table 3.

TABLE 3

|  | Initial discharge capacity (mAh/g) | Initial charge capacity (mAh/g) | Initial efficiency (%) | Heat-generation initiating temperature (° C.) |
| --- | --- | --- | --- | --- |
| Example 1 | 187 | 212 | 88.2 | 147 |
| Example 2 | 194 | 214 | 90.8 | — |
| Example 3 | 184 | 211 | 87.2 | — |
| Example 5 | 189 | 212 | 89.2 | — |
| Comparative Example 2 | 180 | 211 | 85.0 | 135 |

In addition, coin cells were respectively produced from the Li—Ni composite oxide particles obtained in Example and Comparative Example 2, and subjected to differential scanning calorimetry to evaluate a safety thereof. The results are shown in FIG. 3.

Figure 3:
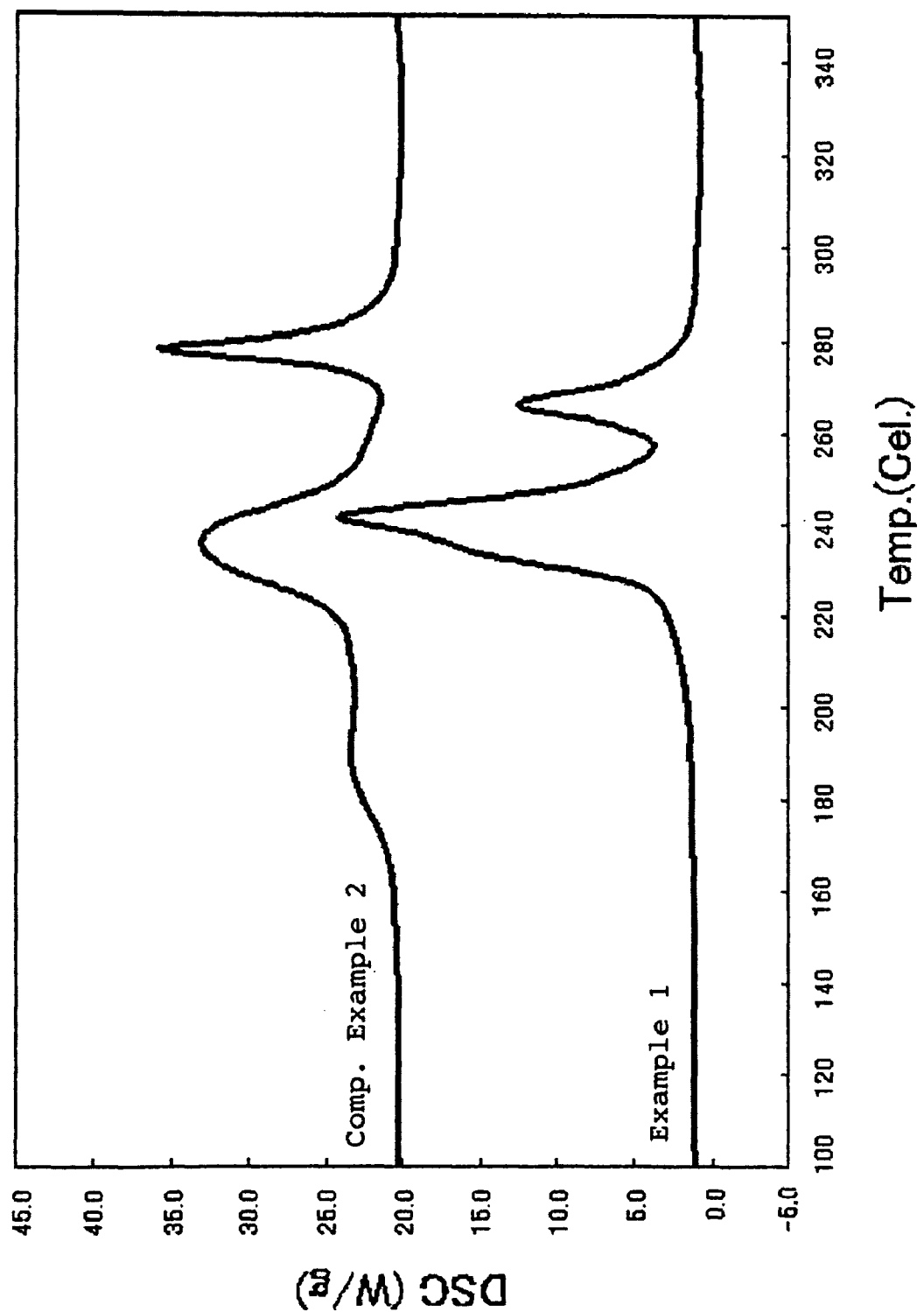
FIG. 3 is a view showing the results of differential scanning calorimetry of Li—Ni composite oxides obtained in Example 1 and Comparative Example 2 in which a cell was charged up to 4.3 V.

From FIGS. 2 and 3 and Table 3, it was confirmed that since the Li—Ni composite oxide particles obtained in Example 1 had a high crystallinity, excellent initial charge/discharge characteristics and a high safety, it was effective to coat the Ni—Co hydroxide having a less sulfate ion content with aluminum hydroxide having a primary particle diameter of not more than 1 μm.

Figure 4:
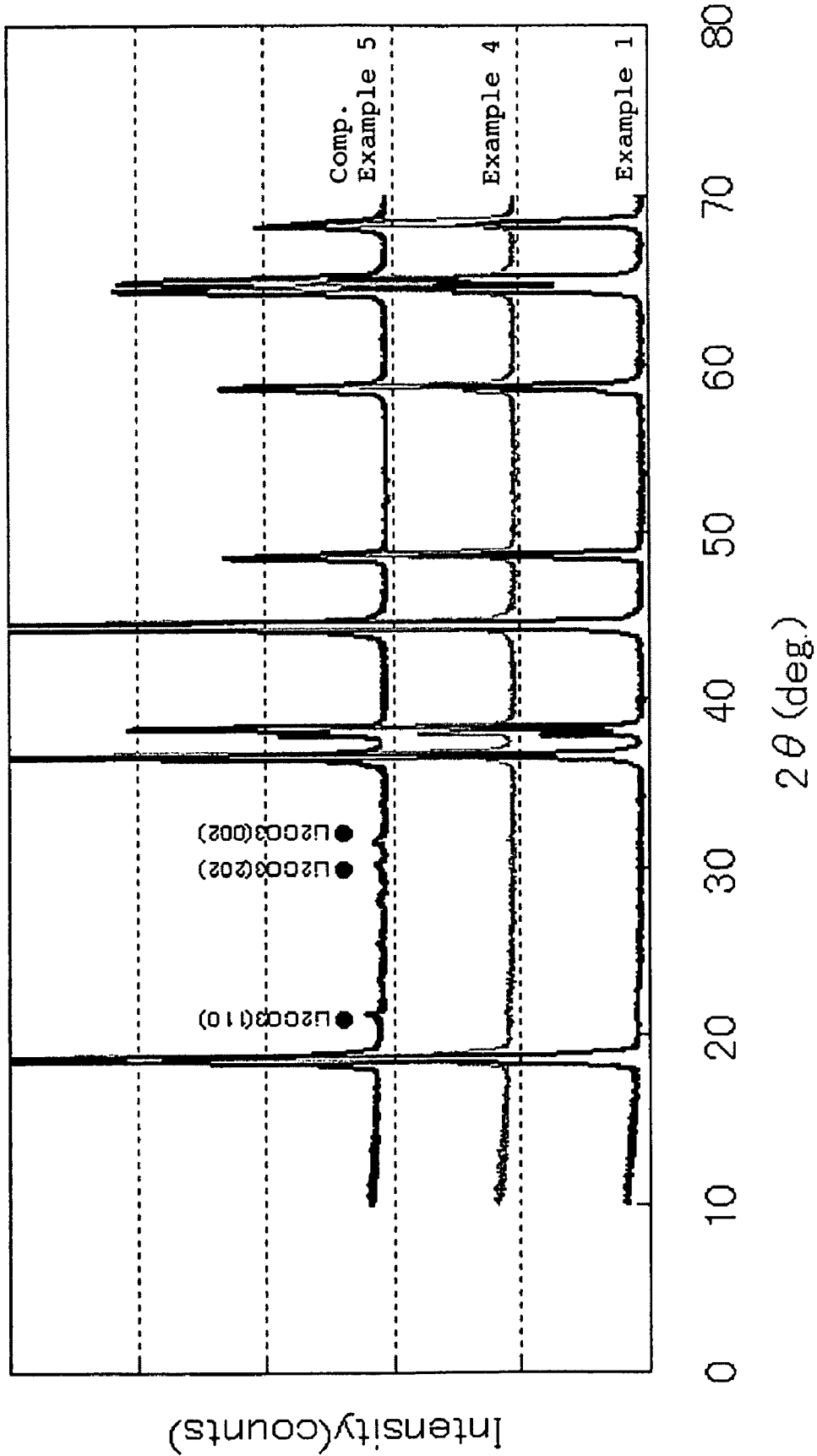
FIG. 4 is a view showing powder X-ray diffraction patterns of Li—Ni composite oxides obtained in Examples 1 and 2 and Comparative Example 5.

The powder X-ray diffraction patterns of the Li—Ni composite oxide particles obtained in Examples 1 and 4 and Comparative Example 5 are shown in FIG. 4.

Coin cells were respectively produced from the Li—Ni composite oxide particles obtained in Examples 1 and 4 and Comparative Example 5, and subjected to evaluation of initial charge/discharge characteristics thereof. The results are shown in Table 4.

TABLE 4

| | Lithium carbonate content in lithium hydroxide (%) | Initial discharge capacity (mAh/g) | Initial charge capacity (mAh/g) | Initial efficiency (%) |
| --- | --- | --- | --- | --- |
| Example 1 | 0.3 | 187 | 212 | 88.2 |
| Example 4 | 1.0 | 183 | 209 | 87.6 |
| Comparative Example 5 | 5.3 | 165 | 200 | 82.5 |

From FIG. 4 and Table 4, it was confirmed that since the Li—Ni composite oxide particles obtained in Examples 1 and 4 had a high crystallinity and excellent initial charge/discharge characteristics, the lithium carbonate content in the lithium hydroxide used was less than 5% and preferably not more than 1%.

From the above-described results, it was confirmed that the Li—Ni composite oxide particles of the present invention exhibited a large charge/discharge capacity and, therefore, were effectively used as an active substance for a non-aqueous electrolyte cell having an excellent packing density and excellent storage performance.

When using the Li—Ni composite oxide particles which are obtained by mixing Ni—Co hydroxide particles having a residual sulfate ion content of not more than 1.0% whose surface is coated with an Al compound having a primary particle diameter of not more than 1 μm or a mixture of Ni—Co hydroxide particles having a residual sulfate ion content of not more than 1.0% and aluminum hydroxide having a residual sulfate ion content of not more than 0.05% and a primary particle diameter of not more than 1 μm, with lithium hydroxide having a lithium carbonate content of less than 5%, and calcining the resulting mixture, it is possible to produce a non-aqueous electrolyte cell exhibiting a large charge/discharge capacity, an excellent packing density and excellent storage performance.

The invention claimed is:

1. Li—Ni composite oxide particles for a non-aqueous electrolyte secondary cell, having a composition represented by the formula:

$$Li_xNi_{1-y-z}Co_yAl_zO_2$$

in which $0.9<x<1.3$; $0.1<y<0.3$; and $0<z<0.3$,
wherein the composite oxide particles have a rate of change in specific surface area of not more than 10% as measured between before and after applying a pressure of 1 t/cm² thereto, and a sulfate ion content of not more than 1.0%.

2. Li—Ni composite oxide particles for a non-aqueous electrolyte secondary cell according to claim 1, wherein the composite oxide particles have a density of not less than 2.85 g/mL as measured upon applying a pressure of 1 t/cm² thereto, and a sulfate ion content of not more than 1.0%.

3. A process for producing the Li—Ni composite oxide particles as defined in claim 1, comprising the steps of;
mixing Ni—Co hydroxide particles having a sulfate ion content of not more than 1.0% whose surface is coated with an Al compound having a primary particle diameter of not more than 1 μm or a mixture of Ni—Co hydroxide particles having a sulfate ion content of not more than 1.0% and aluminum hydroxide having a sulfate ion content of not more than 0.1% and a primary particle diameter of not more than 1 μm, with a lithium compound; and
calcining the resulting mixture.

4. A process for producing the Li—Ni composite oxide particles, wherein the lithium compound is lithium hydroxide, and a content of lithium carbonate in the lithium hydroxide is less than 5%.

5. A non-aqueous electrolyte secondary cell using a positive electrode comprising a cathode material comprising the Li—Ni composite oxide particles for a non-aqueous electrolyte secondary cell as defined in claim 1.

* * * * *